United States Patent
Wang et al.

(10) Patent No.: US 10,902,024 B2
(45) Date of Patent: Jan. 26, 2021

(54) COLLECTING AND ORGANIZING ONLINE RESOURCES

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 748 days.

(21) Appl. No.: 15/003,306

(22) Filed: Jan. 21, 2016

(65) Prior Publication Data
US 2017/0212948 A1 Jul. 27, 2017

(51) Int. Cl.
G06F 16/00 (2019.01)
G06F 16/28 (2019.01)
G06F 16/93 (2019.01)
G06F 16/435 (2019.01)
G06F 16/2457 (2019.01)

(52) U.S. Cl.
CPC ...... *G06F 16/285* (2019.01); *G06F 16/24575* (2019.01); *G06F 16/24578* (2019.01); *G06F 16/437* (2019.01); *G06F 16/93* (2019.01)

(58) Field of Classification Search
None
See application file for complete search history.

(56) References Cited

U.S. PATENT DOCUMENTS 5,987,460 A * 11/1999 Niwa ............... G06F 16/338
8,209,338 B2 * 6/2012 Wallace ............ G06F 16/51
707/749
2006/0282304 A1 * 12/2006 Bedard ............ G06F 17/30867
705/7.33
2008/0065666 A1 * 3/2008 Rose ............... G06F 17/30994
2009/0248707 A1 * 10/2009 Mehta ............. G06F 17/212
2015/0286736 A1 10/2015 Wang et al.
2017/0185599 A1 * 6/2017 Glover ............ G06F 16/24578

OTHER PUBLICATIONS

Jonathan L. Herlocker ; "Explaining Collaborative Filtering Recommendations"; ACM; 2000 pp. 241-250 (Year: 2000).*

(Continued)

*Primary Examiner* — Mariela Reyes
*Assistant Examiner* — Jermaine A Mincey
(74) *Attorney, Agent, or Firm* — Maschoff Brennan

(57) ABSTRACT

A method of collecting and organizing online resources may include selecting an item from an electronic document. The method may include extracting data related to the item from the electronic document. The method may include identifying whether a first list that includes the item is associated with the electronic document. The method may include refining the first list in response to an identification of the first list. The method may include generating a second list that includes the item in response to a failure to identify the first list. The method may include verifying that the first list is consistent with a user interest. The method may include saving the first list to an electronic data storage device when the first list is consistent with the user interest. The method may include selecting a second item when the first list is inconsistent with the user interest.

16 Claims, 9 Drawing Sheets

(56) References Cited

OTHER PUBLICATIONS

Shelton, B. E., Duffin, J., Wang, Y., & Ball, J. "Linking OpenCourseWares and open education resources: Creating an effective search and recommendation system." 1st Workshop on Recommender systems for Technology Enhanced Learning (RecSysTEL 2010). Procedia Computer Science 1, 2865-2870, Sep. 29, 2010.
Xiong, Yuhong; Luo, Ping; Zhao, Yong; Lin, Fen; Feng, Shicong; Zhou, Baoyao; Zheng, Liwei. "OfCourse: web content discovery, classification and information extraction for online course materials." CIKM 2009: 2077-2078, Nov. 2, 2009.
Mahdi Naghibi, Adel Torkaman Rahmani, "Focused Crawling Using Vision-Based Page Segmentation", Information Systems, Technology and Management Communications in Computer and Information Science vol. 285, pp. 1-12, Mar. 28, 2012.
Tao Peng, Changli Zhang, Wanli Zuo, "Tunneling enhanced by web page content block partition for focused crawling," Concurrency and Computation: Practice and Experience, vol. 20, Issue 1, pp. 61-74, Jan. 2008.
JP Office Action in Application No. 2017-008391 dated Dec. 1, 2020.

\* cited by examiner

COLLECTING AND ORGANIZING ONLINE RESOURCES

FIELD

The embodiments discussed herein are related to collecting and organizing online resources.

BACKGROUND

In this information age, there is an overwhelming amount of information readily available and accessible partly due to the ability of individuals to disseminate information freely, quickly, and easily. Often, people may be interested in specific pieces of information. Although the Internet is a vast trove of information, the information may be scattered online among various websites and platforms. Because of the vastness of the scattered information available on the Internet, it may be difficult for a user to search, aggregate, collect and organize information.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of collecting and organizing online resources may include selecting an item from massive online resources. The method may include extracting data related to the item. The method may include identifying whether a first list that includes the item. The method may include refining the first list in response to an identification of the first list. The method may include generating a second list that includes the item in response to a failure to identify the first list. The method may include verifying that the first list is consistent with a user interest. The method may include saving the first list to an electronic data storage device when the first list is consistent with the user interest. The method may include selecting a second item when the first list is inconsistent with the user interest.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments discussed herein are related to collecting and organizing online resources.

The Internet may include a wide variety of user-created lists that may imply relatedness between items in the lists. For example, a video playlist may indicate similarity among at least some of the videos in the playlist. In another example, categories on a blog website may indicate similarity between different blog articles that have been tagged with the same category. In yet a further example, an album of photos may indicate relatedness between the at least some of the photos in the album. The methods and systems described may use existing lists (e.g., user-generated or automatically generated) to further collect and organize information. For example, a method of collecting and organizing online resources may include identifying a seed item (e.g., a webpage, a photo, a video, a song, a blog entry). The method may include identifying one or more lists. For example, when the seed item is a video on a video platform, the method may identify a channel that is associated with the video. The method may include identifying one or more playlists that are associated with the channel. Using the playlists, the method may identify additional items (e.g., a playlist, another video) that may be related to the seed item. The method may update the channel and/or one or more of the playlists to include at least one of the additional items. In at least one embodiment, the method may include creating a new list (e.g., a new playlist) that may include the seed item and other related items. The methods and systems described herein may systematically collect online resources, and in addition to discovering related items, the methods and systems may also collect items which may be tightly connected or highly consistent with each other, such as all lecture items in an educational course (or in multiple courses on the same subject taught at different schools).

Figure 1:
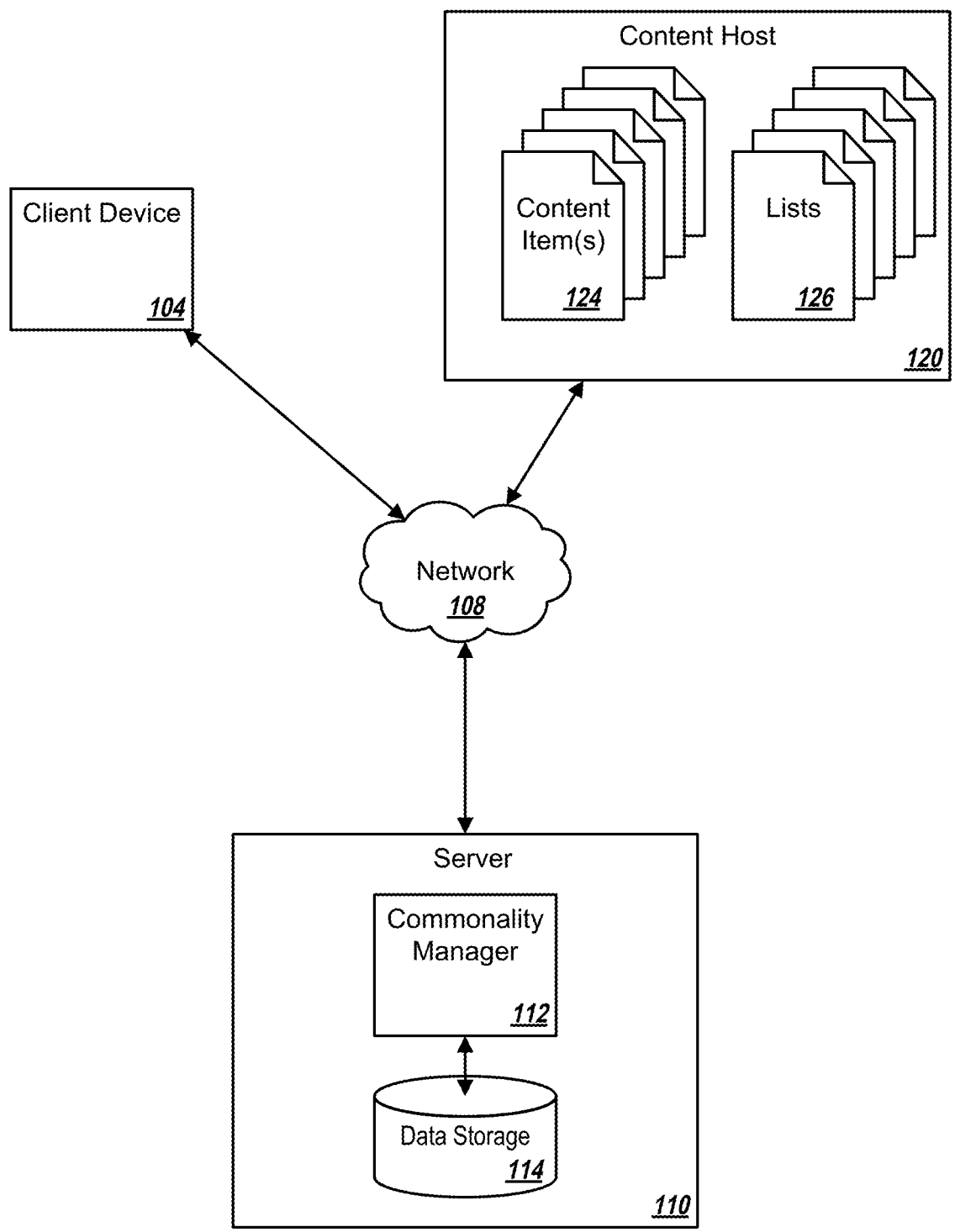
FIG. 1 illustrates an example network architecture.

FIG. 1 illustrates an example network architecture 100 in which embodiments of the present disclosure may be implemented. The network architecture 100 may include a client device 104, a network 108, a server 110 and a content host 120.

The client device 104 may include a computing device such as personal computer (PC), laptop, mobile phone, smart phone, tablet computer, netbook computer, e-reader, personal digital assistant (PDA), or cellular phone, etc. While only one client device is illustrated in FIG. 1, network architecture 100 may include any number client devices.

The network 108 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network), routers, hubs, switches, server computers, and/or a combination thereof.

The server 110 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The server 110 may systematically collect online resources (e.g., media item(s) 124, lists 126, as described in further detail below) from one or more content hosts 120, analyze the online resources, and determine commonality and between online resources.

The content host 120 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. In at least one embodiment, the content host 120 may be configured as a node in a peer-to-peer (P2P) network. The content host 120 may provide online resources 122, such as digital content item 124 (e.g., video, streaming video, music, streaming music, social media information, website, blog, learning material, a text document, an image, an article, a series of articles, a portion of an article, graphics, or any other digital information in any form) and one or more lists 126 (e.g., playlist, category, tag) to the client device 104 and/or to the server 110 via the network 108. The one or more lists 126 may be user-defined and/or automatically generated by the commonality manager 112.

The server 110 may include a commonality manager 112. The commonality manager 112 may be configured to collect online resources via the network 108. The commonality manager 112 may organize online resources by creating or refining a list (e.g., a web site, a channel, a playlist). The commonality manager 112 may select content item 124 from online resources. The commonality manager 112 may extract data related to the content item 124. The data related to the content item 124 may include one or more lists 126. The commonality manager 112 may identify whether a first list (such as one of lists 126) that includes the item is associated with the electronic document. The commonality manager 112 may refine the first list in response to an identification of the first list. The commonality manager 112 may generate a second list that includes the content 124 in response to a failure to identify the first list. The commonality manager 112 may verify that the first list is consistent with a user interest. The commonality manager 112 may save the first list to an electronic data storage device (e.g., data storage 114) when the first list is consistent with the user interest. Functions and operations of the commonality manager 112 are further described in conjunction with FIGS. 2-8.

In at least one embodiment, the content host 120 may be configured to host a website that is accessible via the network 108. Specifically, in some embodiments, the content host 120 may allow access to the website by the client device 104, and/or the server 110 using the commonality manager 112.

The client device 104 may be configured to provide a user interface in a browser by the commonality manager 112 that allows a user to select an item (e.g., content 124). In this and other embodiments, the client device 104 may provide the user interface. In some embodiments, the client device 104 may include a program (e.g., a thin-client program) installed thereon that provides the user interface and/or one or more functions attributed to the client device 104.

Modifications, additions, or omissions may be made to the network architecture 100 without departing from the scope of the present disclosure. Specifically, embodiments of the network architecture 100 depicted in FIG. 1 include one client device 104, one server 110, and one content host 120. However, the present disclosure more generally applies to the network architecture 100 including one or more client devices 104, one or more servers 110, one or more content hosts 120, or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

The client device 104 may include an application (not illustrated) that allows an end user to find, select and/or play content item 124 via the network 108. For example, the application may include a web browser that may present content item 124 to the end user. As a web browser, the application may also access, retrieve, present, and/or navigate content (e.g., web pages such as Hyper Text Markup Language (HTML) pages, digital media items, etc.) served by a web server. The application may render, display, and/or present the content item 124 channels and associated content to the end user. The application may also provide an embedded media player (e.g., a Flash® player or an HTML5 player) that is embedded in a web page (e.g., a web page that may provide information about a product sold by an online merchant). In another example, the application may include a standalone application (e.g., a mobile application or mobile app) that allows users to consume digital media items (e.g., digital videos, digital images, electronic books, etc.). The application may be provided to the client device by any source.

Figure 2:
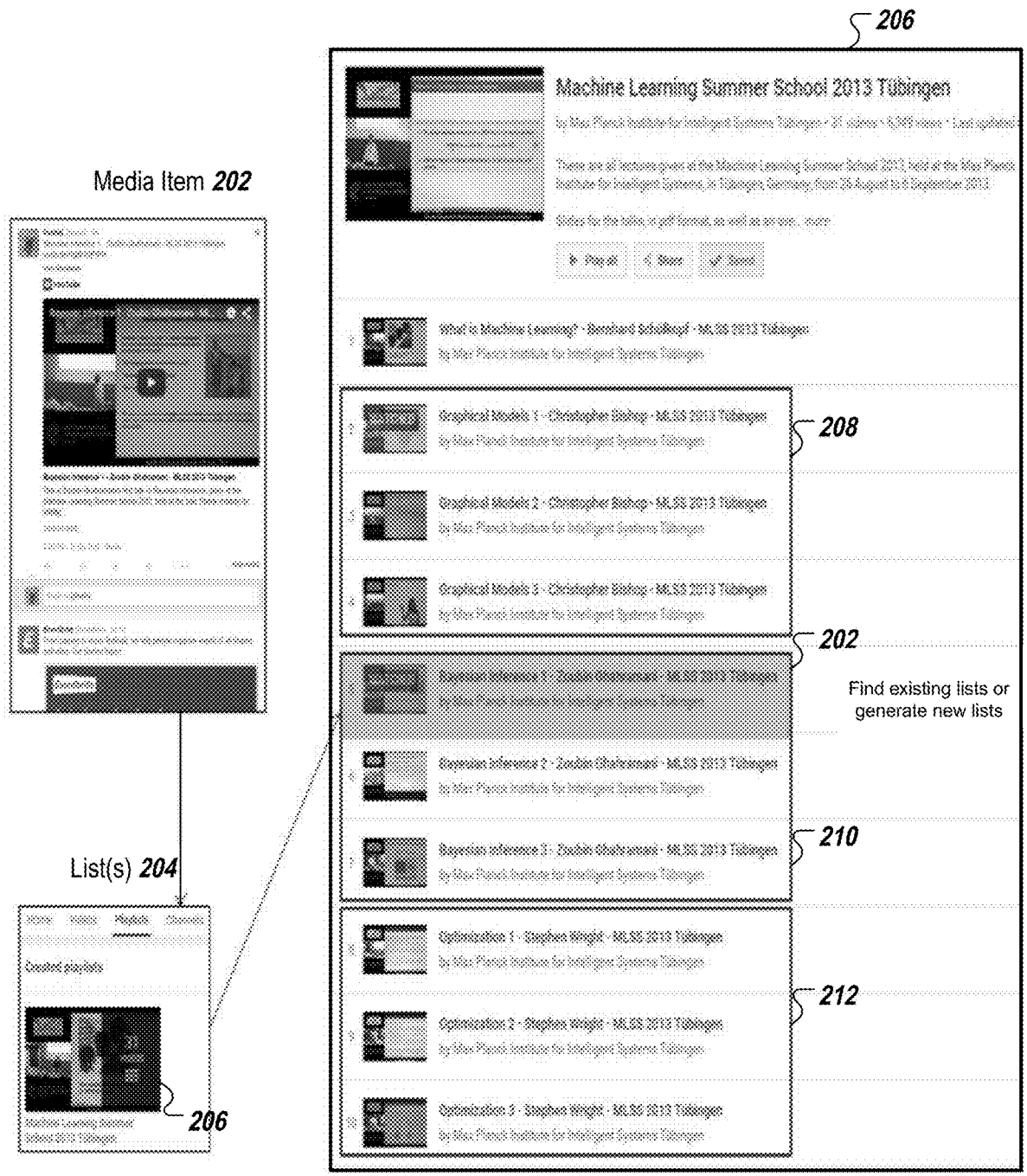
FIG. 2 illustrates an example set of screenshots of an example identification of a list associated with a media item.

FIG. 2 illustrates an example set of screenshots of an example identification of a list 210 associated with a media item 202. The media item 202 may be used as a "seed item" to identify one or more lists from all available lists 204. For example, the media item 202 may include any type of media item 202 and may also include a link (e.g., URL, web address) to the media item 202. As illustrated, the media item 202 is a link to the actual media item 202. The link may be associated with a post on a web site. A commonality manager (e.g., commonality manager 112 of FIG. 1) may access the media item 202, such as directly on a host website (e.g., content host 120 of FIG. 1), or by activing a link that redirects the commonality manager to the host website. The commonality manager may check lists on the host website that may be associated with the media item 202. As illustrated, the host website includes a channel for presenting media items. The channel may include a list of playlists 204 associated with the channel. The commonality manager may access one or more of the playlists. As illustrated, the commonality manager has accessed a playlist 206 entitled "Machine Learning Summer School 2013 Tubingen." The playlist may include any number of media items. As illustrated, the playlist includes ten media items. The commonality manager may generate one or more new refined lists (e.g., lists 208, 210, 212) based on the information associated with the media items in the playlist 206. For example, the commonality manager may identify the titles of each of the media items and, based on the titles, the commonality manager may create lists 208, 210, 212. As illustrated, list 208 is created to include media items with a title that includes the phrase "Graphical Models [X]" where [X] may include a dynamic variable so as to include all videos in a series of length [X]. Similarly, the commonality manager may create list 210 based on media items with a title including the phrase the text "Bayesian Interference [Y]," where [Y] is a variable similar to [X]. As illustrated, list 210 includes media item 202. The commonality manager may also create list 212 in a similar manner (e.g., based on media items with a title including the phrase "Optimization [Z]," where [Z] includes a variable similar to [X].

The commonality manager may store the lists 208, 210, 212 in a data storage (e.g., data storage 114 of FIG. 1). In at least one embodiment, the commonality manager may cause the lists to be presented to a user via a graphical user interface. In at least one embodiment, the commonality manager may identify one or more preexisting lists that may be similar to any one (or more) of lists 208, 210, and 212. If such a similarity is identified, the commonality manager may recommend or combine those lists that were identified as being similar.

FIGS. 3-8 illustrate flow diagrams of example methods related to generating and/or refining a list based on a media item. The methods may be performed by processing logic that may include hardware (circuitry, dedicated logic, etc.), software (such as is run on a general purpose computer system or a dedicated machine), or a combination of both, which processing logic may be included in the commonality manager 112 or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 3:
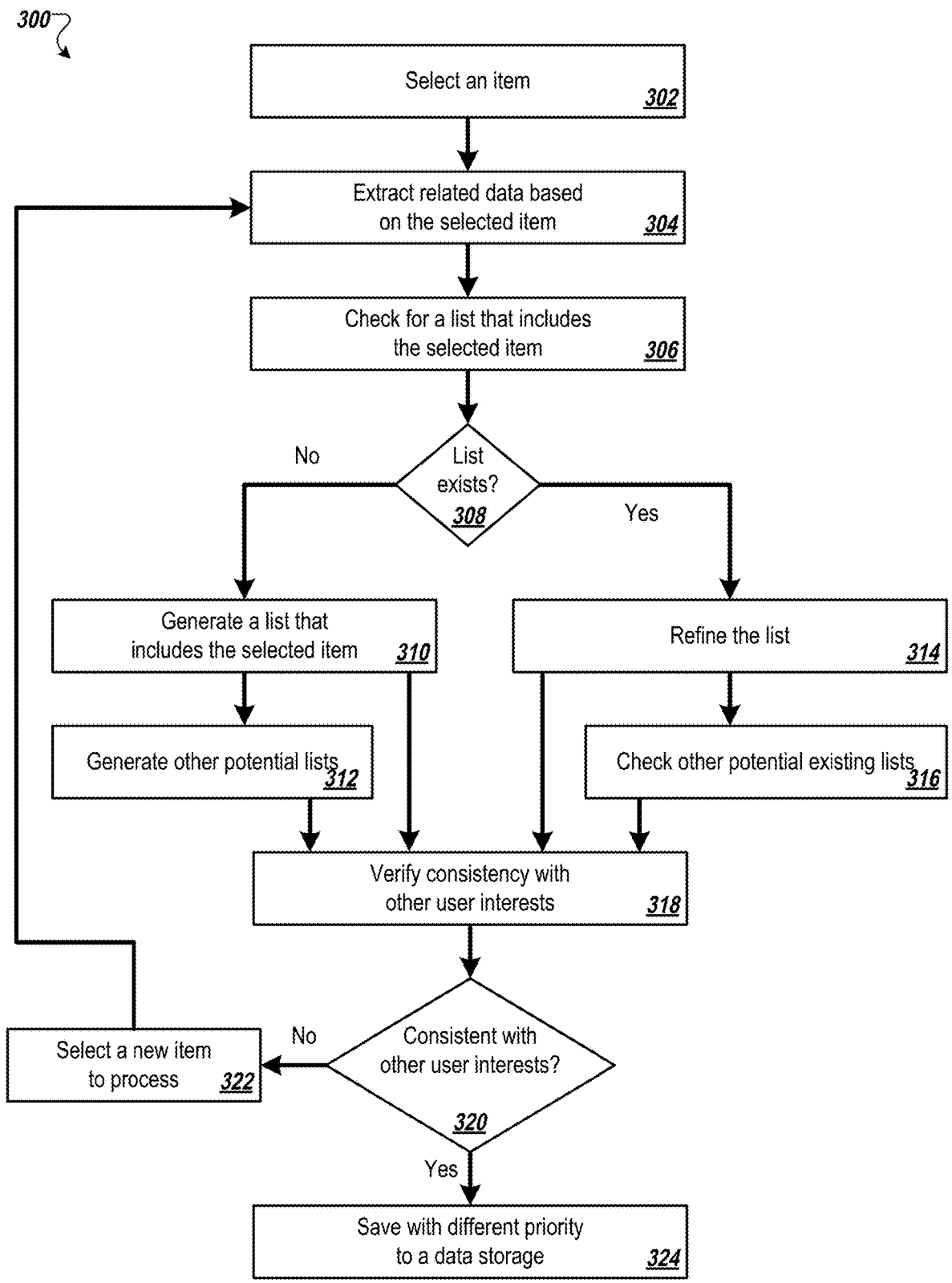
FIG. 3 illustrates a flow diagram of an example method of generating and/or refining a list based on a media item.

FIG. 3 illustrates a flow diagram of an example method 300 of generating and/or refining a list based on a media item. The method 300 may begin at block 302, where processing logic may select an item. In at least one embodiment, the processing logic may select the item in response to receiving a user selection of the item from online resources (e.g., web sites). Alternatively, the processing logic may automatically select the item from a set of online resources without user input. The set of online resources may include one or more media items. In at least one embodiment, the one or more media items have been identified as being of interest to a user. The user interests may be indicated by user input, by a machine, or a combination thereof.

At block 304, the processing logic may extract related data based on the selected item. The processing logic may also extract any information of the channel, such as all media items associated with the channel, playlists associated with the channel, etc. Additional details related to extracting related data based on the selected item are described in conjunction with FIG. 4. The processing logic may store any of the extracted related data in a data storage.

At block 306, the processing logic may check the related data for a list that includes the selected item. For example, the processing logic may analyze one or more playlists associated with the channel to determine whether the selected item is included in at least one of the one or more playlists.

When the processing logic does not identify a list that includes the selected item ("NO" at block 308), the processing logic may generate a list that includes the selected item at block 310. When generating the list that includes the selected item, the processing logic may define a name for the list using one or more words associated with the selected item.

At block 312, the processing logic may generate another potential list (e.g., a second generated list) that includes other potential items. The potential list may relate to the first generated list. The processing logic may use the related data extracted at block 304 to generate the second list. For example, the processing logic may scan all items in the channel to generate multiple lists using repeated pattern discovery, and check whether the processing logic may find any list related to the first generated list containing the selected item among these generated lists.

Figure 5:
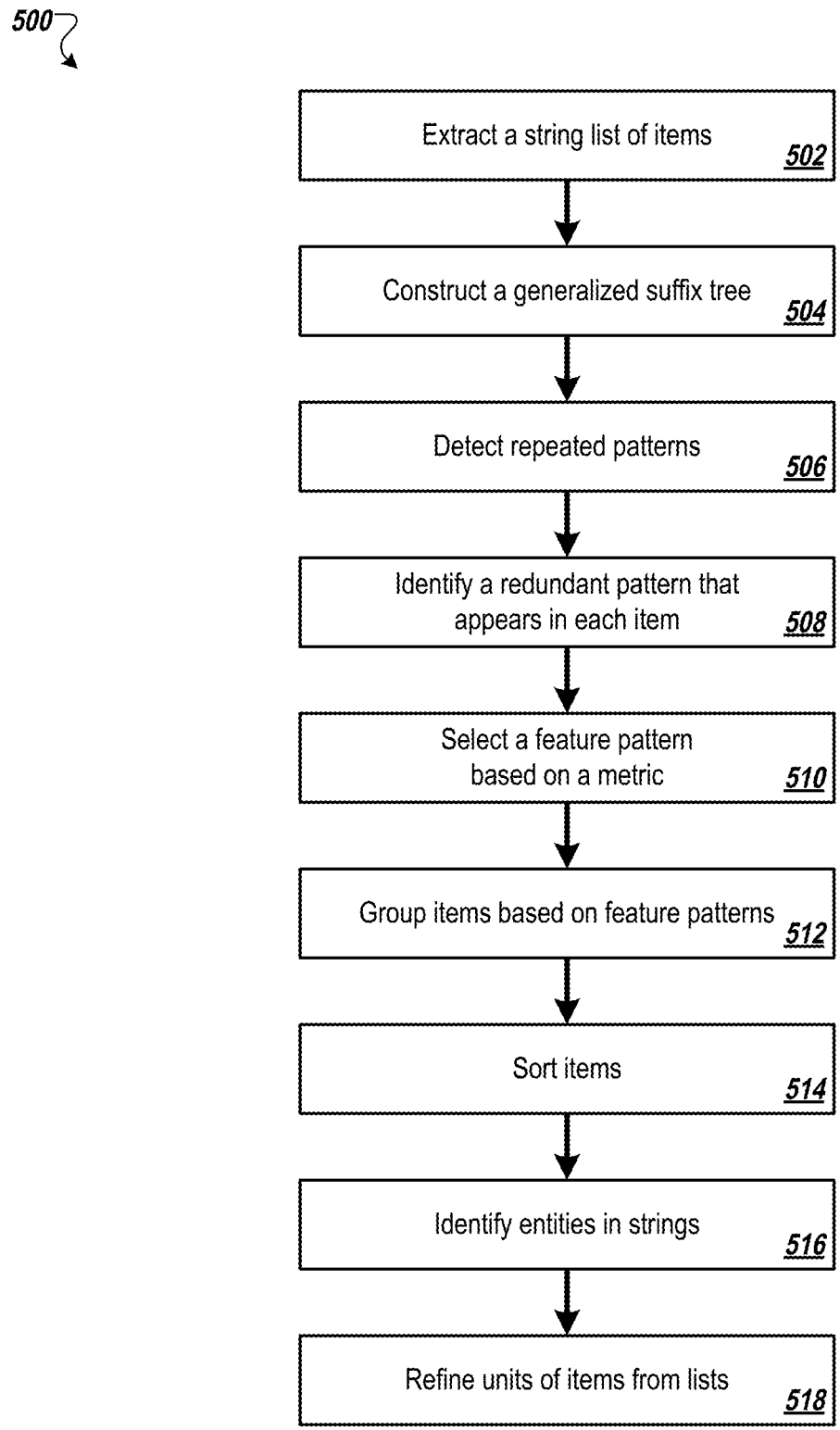
FIG. 5 illustrates a flow diagram of an example method of refining a list.

When the processing logic identifies a list that includes the selected item ("YES" at block 308), the processing logic may refine the list at block 314, as further described in conjunction with FIG. 5.

Figure 6:
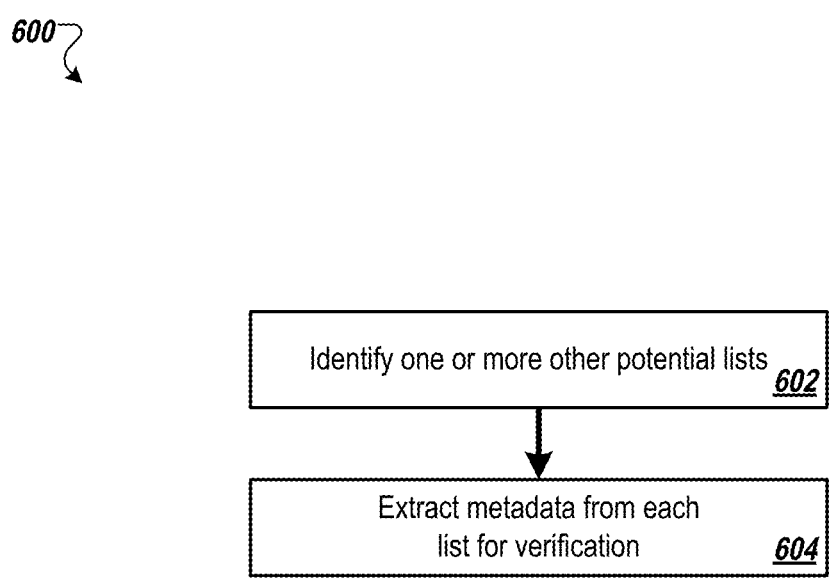
FIG. 6 illustrates a flow diagram of an example method to check other potential existing lists.

At block 316, the processing logic may check if there are other existing potential lists related to the refined list containing the selected item, as further described in conjunction with FIG. 6.

Figure 7:
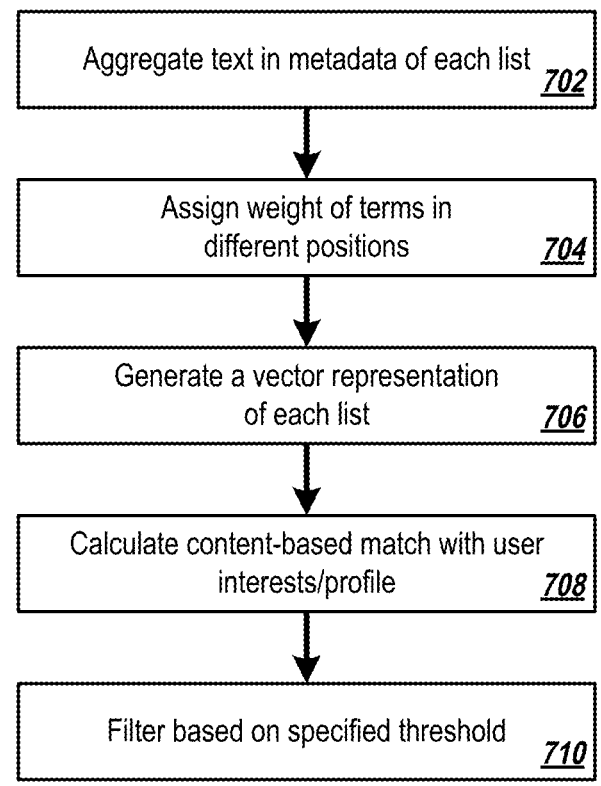
FIG. 7 illustrates a flow diagram of an example method of verifying consistency with user interests.

At block 318, the processing logic may verify that the list is at least somewhat consistent with user interests, as further described in conjunction with FIG. 7. When the processing logic does not verifies consistency with user interest ("NO" at block 320), at block 322 the processing logic may select a new item to process. The processing logic may proceed to block 304 in response to selecting a new item to process.

Figure 8:
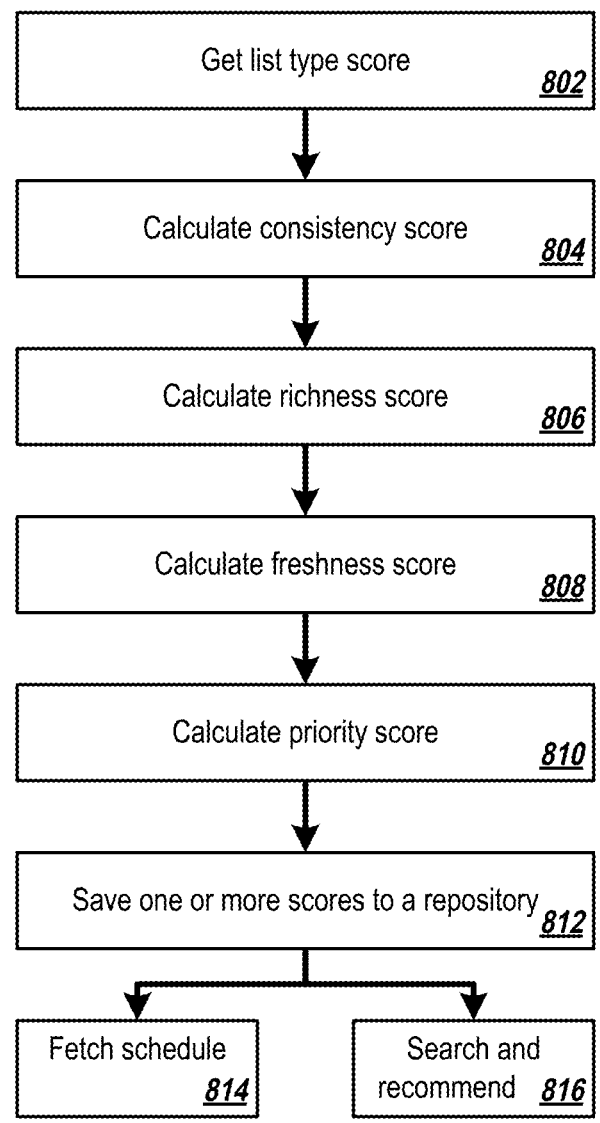
FIG. 8 illustrates a flow diagram of an example method of saving a list to a repository with a different priority.

When the processing logic verifies consistency with user interest ("YES" at block 320), at block 324 the processing logic may save the list with a different priority to a data storage, as further described in conjunction with FIG. 8.

Figure 4:
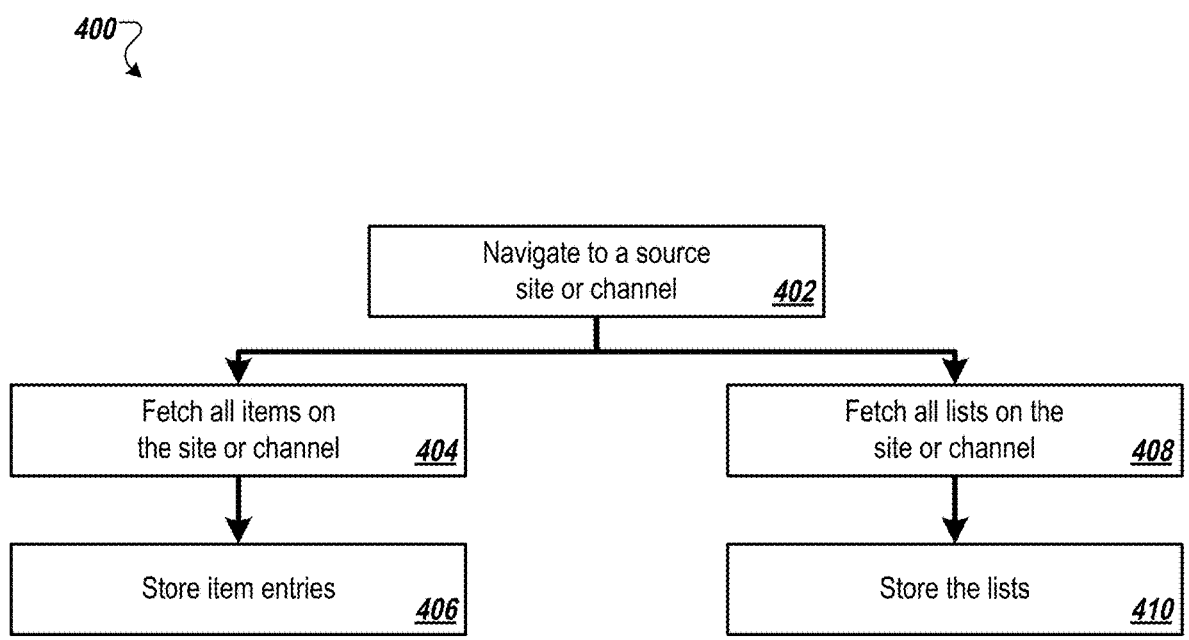
FIG. 4 illustrates a flow diagram of an example method of extracting related data based on a selected item.

FIG. 4 illustrates a flow diagram of an example method 400 of extracting related data based on a selected item. The item may be selected as described in conjunction with FIG. 3. The selected item may also be associated with related data that may be extracted as described in conjunction with FIG. 3.

The method 400 may begin at block 402 where the processing logic may navigate to a source site or channel (e.g., a channel of a content sharing platform). In at least one embodiment, the processing logic may use the extracted related data to identify the source site or channel. For example, the extracted related data may include metadata that identifies a source site or a channel with which the media item may be associated.

At block 404, the processing logic may fetch some or all items on the site or channel. For example, the processing logic may identify one or more media items that are associated with the site or channel. For example, the site may include a blog with one or more media items that are included in various blog entries. In another example, the media items may be uploaded to a channel of a content hosting platform. The processing logic may identify each of the media items that have been uploaded to the content hosting platform and associated with the channel. In at least one embodiment, the processing logic may fetch all items on the site or channel using techniques as described in conjunction with FIG. 2.

At block 406, the processing logic may store item entries based on the items fetched at block 404. In at least one embodiment, the processing logic may create or modify an entry in a data structure for each fetched item. The processing logic may store any metadata associated with each item. The processing logic may store the item entries in a data storage, such as data storage 114 of FIG. 1.

At block 408, the processing logic may fetch all lists on the site or channel. The processing logic may navigate to sub-pages, groups, category listings, etc. when fetching all lists on the site or channel. For example, the processing logic may navigate to a channel of a content hosting platform and may discover one or more lists on the channel (e.g., the playlists illustrated in lists 204 of FIG. 2). For example, the processing logic may navigate to a playlists page within a channel and fetch all lists.

At block 410, the processing logic may store the lists that were fetched at block 408. In at least one embodiment, the processing logic may create or modify an entry in a data structure for each fetched list. The processing logic may store the fetched lists in a data storage, such as data storage 114 of FIG. 1.

FIG. 5 illustrates a flow diagram of an example method 500 of refining a list. The method 500 may begin at block 502 where the processing logic may extract a string list of items in the list. For example, the list may include a playlist and extracting the string list of items in the list may include scraping text from text-based titles of media items in the playlist. Also illustrated in FIG. 2 the string list includes the titles of media items in the playlist: "What is Machine Learning?—Bernhard Schölkopf—MLSS 2013 Tübingen," "Graphical Models 1—Christopher Bishop—MLSS 2013 Tübingen," "Graphical Models 2—Christopher Bishop—MLSS 2013 Tübingen," "Graphical Models 3—Christopher Bishop—MLSS 2013 Tübingen," "Bayesian Interference 1," "Zoubin Ghahramani," and "MLSS 2013 Tübingen," "Bayesian Interference 2," "Zoubin Ghahramani," and "MLSS 2013 Tübingen," "Bayesian Interference 3," "Zoubin Ghahramani," and "MLSS 2013 Tübingen," "Optimization 1—Stephen Wright—MLSS 2013 Tübingen," "Optimization 2—Stephen Wright—MLSS 2013 Tübingen," and "Optimization 3—Stephen Wright—MLSS 2013 Tübingen,"

At block 504, the processing logic may input the string list and construct a generalized suffix tree. At block 506, the processing logic may detect one or more repeated patterns in the generalized suffix tree. For example, the processing logic may detect one or more of repeated patterns such as "Bayesian Interference," "Zoubin Ghahramani," "MLSS 2013 Tübingen," "Graphical Models," "Christopher Bishop," etc. and their corresponding instances in each item.

At block 508, the processing logic may identify redundant pattern appeared in each item. For example, the processing logic may identify a repeated pattern based on the generalized suffix tree, such as "MLSS 2013 Tübingen," which may be redundant, because it appears in each item. The processing logic may ignore the repeated pattern during further processing to group items based on feature patterns.

At block 510, the processing logic may select a feature pattern to group items. In general, the processing logic may select a repeated pattern with maximal length and frequency, such as "Graphical Models [x]—Christopher Bishop", "Bayesian Interference [y]—Zoubin Ghahramani", "Optimization [z]—Stephen Wright" as illustrated in FIG. 2.

At block 512, the processing logic may group items based on the feature patterns. In another example, the processing logic may group item with the text "Graphical Models [x]—Christopher Bishop" in a first group, items with the text "Bayesian Interference [y]—Zoubin Ghahramani" in a second group, etc.

At block 514, the processing logic may sort the items. The items may be sorted in any order, such as alphabetical, by time (e.g., upload date, creation date), by popularity, by frequency, etc.

At block 516, the processing logic may identify entities in strings. For example, the processing logic may identify a person name or an institution name, event name, technology terms, among others.

At block 518, the processing logic may refine units of items from lists. The processing logic may further organize these items, such as may be further organized by identified entities.

FIG. 6 illustrates a flow diagram of an example method 600 to check other existing potential lists. The method 600 may begin at block 602 where the processing logic may identify one or more other existing potential lists on a site or channel. For example, the processing logic may identify more than one playlist that may be associated with a channel.

At block 604, the processing logic may extract metadata from each list for verification. For example, the metadata may include information about the channel to which it is may be associated, one or more media items associated with the media items in the playlist, a creator and/or curator of the playlist, a genre of the playlist, etc.

FIG. 7 illustrates a flow diagram of an example method 700 of verifying consistency with user interests. The method 700 may begin at block 702 where the processing logic may aggregate text in metadata of each list. The metadata may include a list title, a list description, a title of each item in the list, a description of each item in the list, etc.

At block 704, the processing logic may assign weight of terms in different positions within the text and/or metadata. For example, a first number of words at the beginning of an item title may be assigned a higher weight, which may indicate that the words at the beginning of the item title may be most useful for organizing and/or refining a list. Alternatively, At block 706, the processing logic may generate a vector representation of each list. In at least one embodiment, the processing logic may calculate the content-based match with the user interests profile using a vector space model, such as a term frequency—inverse document frequency ("TF-IDF"), which may include a numerical statistic that may be intended to reflect how important a word may be to a document in a collection or corpus (or list). Other vector space models may include word embedding and explicit semantic analysis ("ESA").

At block 708, the processing logic may calculate a numerical content-based match with a user interests profile. The match may be measured by calculating a distance between one or more list vectors and one or more user interest vectors. The user interests profile may include a digital representation of user-indicated interests, such as bookmarks, browsing history, etc.

At block 710, the processing logic may filter one or more lists based on a predetermined threshold value. For example, when the content-based match is above a threshold, the processing logic may determine that the associated list may not match the user interests profile and thus, the processing may filter out such a list.

FIG. 8 illustrates a flow diagram of an example method 800 of saving a list to a repository with a different priority. The method 800 may begin at block 802 where the processing logic may get a list type score. The list type score may include a score based on a type of list. The list type may be at least partially determined based on how a list was created. For example, a list may be created by a user or automatically generated. A list created by a user may have a higher list type score because users input and opinions may be valued higher and may have a more refined list of items as compared to an automatically generated list. The list type score may also be influenced by whether the list includes a selected item (e.g., an item selected at block 302 of FIG. 3). A list that includes the selected item may have a higher list type score than a list that does not include the selected item.

At block 804, the processing logic may calculate a consistency score. The consistency score may be calculated based on internal consistency between the items in the list. The internal consistency may increase as items in the list are more consistent (or similar to) each other. The consistency score may also be calculated based on general consistency with respect to a user profile. In at least one embodiment, the processing logic may average internal consistency and general consistency with specific weights.

At block 806, the processing logic may calculate a richness score. The richness score may be indicative of how interesting and/or informative the content in the list may be. A list that is more interesting and/or informative may have a higher richness score. In at least one embodiment, duration and/or length may influence the richness score. For example, average video and/or article length may contribute to the richness score. In at least one embodiment, media items below a minimum threshold length may have a lower richness. Similarly, media items above the minimum threshold length may have a higher richness. In at least one embodiment, media items above a maximum threshold length may have a lower richness. In these embodiments, media items with a length between the minimum and maximum thresholds may have higher richness. The number of items in a list may also be used to measure a richness of the list.

At block 808, the processing logic may calculate a freshness score. The freshness score may be date-related, where more recent items or lists may have a higher freshness score as compared to less recent items. The freshness score may be indicative of how recently content has been published, how recently a user has accessed the content in the list, etc. For example, a course may be taught annually with similar course materials, but the course materials from the most recent may be the most interest. The freshness score may be calculated using an equation such as:

$$\text{Score}_i = \sum_{j=1}^{N_i} e^{-\lambda(t-t_j)},$$

where $\lambda$ includes a constant factor for adjusting time impact, $N_i$ includes a number of items in a list i, t includes a current time, and $t_j$ includes a time of item j. In at least one embodiment, the freshness score includes a number between zero and one.

At block 810, the processing logic may calculate a priority score. The priority score may include a linear combination of one or more of the list type score, consistency score, richness score and freshness score. In at least one embodiment, at least one weight may be used to calculate the priority score. The weight may be used to give some of the scores more influence over the priority score. The weight may include a user-generated weight or an automatically generated weight (e.g., based on machine learning). In at least one embodiment, one or more of the list type score, consistency score, richness score and freshness scores may be mapped into a priority score using linear regression.

At block 812, the processing logic may save the list to a repository with the priority score. For example, the processing logic may save the list and the corresponding priority score to a repository, such as the data storage 114 of FIG. 1. At block 814, the processing logic may set a schedule based on the priority score. The schedule may be any time period. The schedule may define a time period in which the processing logic may calculate the priority score in some examples. At block 816, the processing logic may search and recommend the list, which may be based on the priority score. To recommend the list, the processing logic may send a message to a user.

Figure 9:
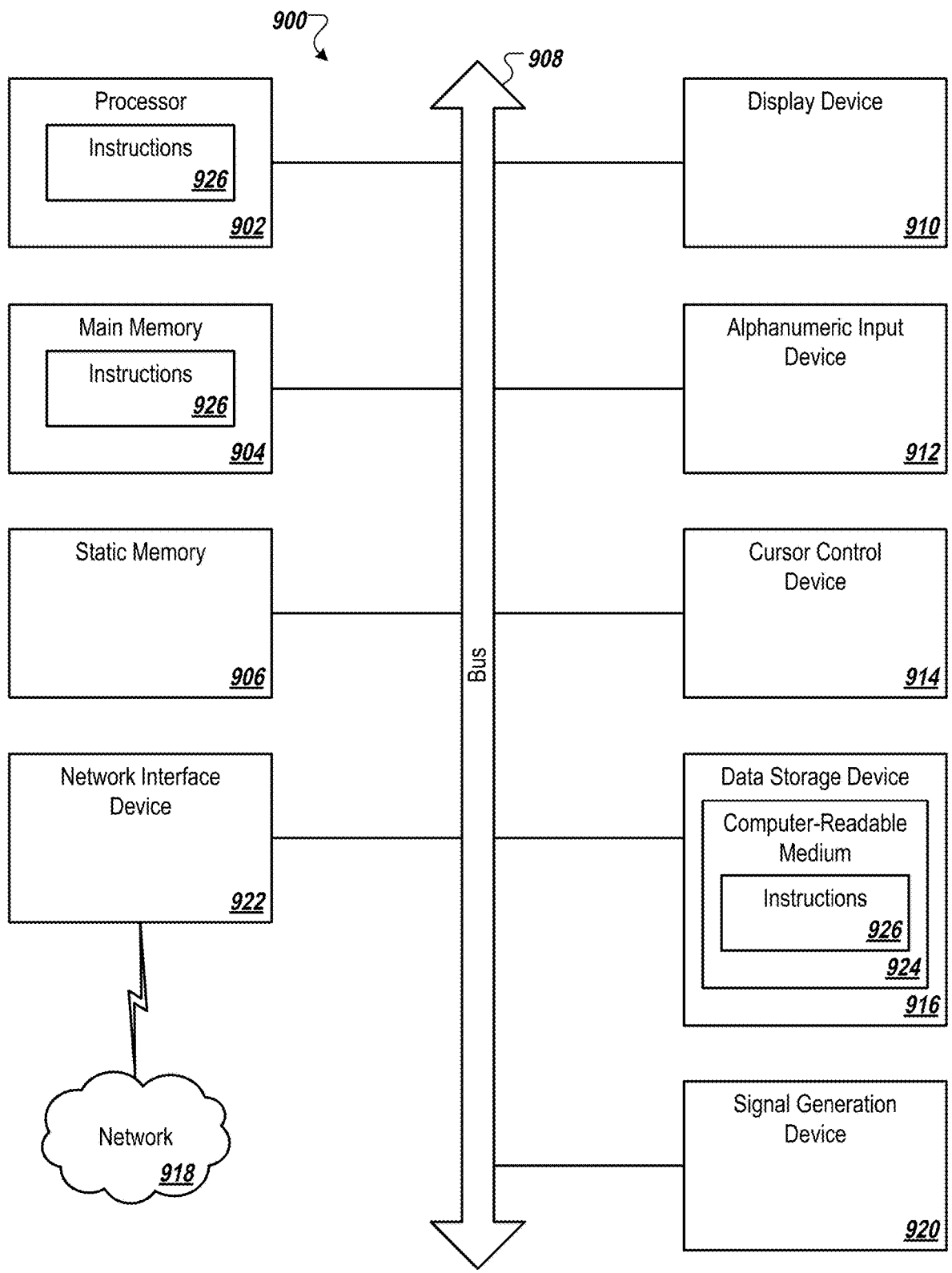
FIG. 9 illustrates a diagrammatic representation of a machine in the example form of a computing device within which a set of instructions, for causing the machine to perform any one or more of the methods discussed herein, may be executed, and all arranged in accordance with at least one embodiment described herein.

FIG. 9 illustrates a diagrammatic representation of a machine in the example form of a computing device 900 within which a set of instructions, for causing the machine to perform any one or more of the methods discussed herein, may be executed. The computing device 900 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 916, which communicate with each other via a bus 908.

Processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also include one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computing device 900 may further include a network interface device 922 which may communicate with a network 918. The computing device 900 also may include a display device 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker). In at least one embodiment, the display device 910, the alphanumeric input device 912, and the cursor control device 914 may be combined into a single component or device (e.g., an LCD touch screen).

The data storage device 916 may include a computer-readable storage medium 924 on which is stored one or more sets of instructions 926 (e.g., commonality manager 112) embodying any one or more of the methods or functions described herein. The instructions 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 918 via the network interface device 922.

While the computer-readable storage medium 926 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:
 selecting, by a processing device, a first item from an electronic document;
 extracting, by the processing device, data related to the first item from the electronic document;
 identifying a first list that includes the first item in the data related to the first item;
 refining, by the processing device, the first list in response to an identification of the first list, wherein the refining the first list comprises:
  extracting a string list of text items from the first list by scraping the first list;
  constructing a suffix tree based on the extracted string list of items;
  detecting repeated patterns in the suffix tree;
  identifying a pattern that is present in each item in the string list of items;
  selecting a feature pattern based on a length metric and a frequency metric; and
  grouping two or more items in the string list of items based on the feature pattern;
 attempting to verify that the first list is consistent with a user interest profile, wherein the attempting to verify that the first list is consistent with the user interest profile comprises:
  aggregating metadata of the first list with the metadata from a second list;
  assigning a first weight to the first list and a second weight to the second list;
  generating a first vector representation of the first list and a second vector representation of the second list;
  calculating a first content-based match with the user interest profile by calculating a first distance between the first vector representation of the first list and one or more user interest vectors, and calculating a second distance between the second vector representation of the second list and the one or more user interest vectors; and
  filtering at least one item of either of the first list or the second list based on the first content-based match;
 failing to verify consistency of the first list with user interest profile;
 selecting a second item in the first list to use for a verification of the first list with the user interest profile;
 generating a third vector representation of the first list that excludes to the first item;
 calculating a second content-based match with the user interest profile based on the third vector representation of the first list; and
 verifying, based on the second item and the second content-based match, that the first list is consistent with a user interest profile.

2. The method of claim 1, wherein the extracting data related to the item from the electronic document comprises:
 navigating to an electronic source;
 fetching one or more items that are associated with the electronic source; and
 fetching one or more lists that are associated with the electronic source.

3. The method of claim 1 further comprising:
 identifying a third list in the electronic document; and
 extracting metadata from the second list.

4. The method of claim 1, wherein the first list is saved to the electronic data storage device with an updated priority score.

5. The method of claim 4 further comprising calculating the updated priority score by:
 getting a list type score;
 calculating a consistency score;
 calculating a richness score;
 calculating a freshness score; and
 calculating the updated priority score based on at least one of the consistency score, richness score, or the freshness score.

6. The method of claim 1, wherein the first item is selected from the electronic document by a user.

7. The method of claim 1, wherein the first item is a media item that includes one or more of a webpage, a video, or a blog entry, and wherein the list is one or more of a playlist, a blog category, or a syllabus for an educational course.

8. A non-transitory computer-readable medium having encoded therein programming code executable by a processor to perform operations comprising:
 selecting, by a processing device, a first item from an electronic document;
 extracting, by the processing device, data related to the first item from the electronic document;
 in response to a failure to identify a first list that includes the first item in the data related to the first item, generating, by the processing device, a second list that includes the first item;
 refining the second list by:
  extracting a string list of text items from the second list;
  constructing a suffix tree based on the string list of items;
  detecting repeated patterns in the suffix tree;
  identifying a pattern that is present in each item in the string list of items;
  selecting a feature pattern based on a length metric and a frequency metric; and
  grouping two or more items in the string list of items based on the feature pattern;
 attempting to verify that the second list is consistent with a user interest profile, wherein the attempting to verify that the second list is consistent with the user interest profile comprises:
  aggregating metadata of the second list with the metadata from a third list;
  assigning a first weight to the second list and a second weight to the third list;
  generating a first vector representation of the second list and a second vector representation of the third list;
  calculating a first content-based match with the user interest profile by calculating a first distance between the first vector representation of the second list and one or more user interest vectors, and calculating a second distance between the second vector representation of the third list and the one or more user interest vectors; and
  filtering at least one item of either of the second first list or the third list based on the first content-based match;
 failing to verify consistency of the second list with user interest profile;
 selecting a second item in the second list to use for a verification of the second list with the user interest profile;

generating a third vector representation of the first list that excludes to the first item;

calculating a second content-based match with the user interest profile based on the third vector representation of the first list; and verifying, based on the second item and the second content-based match, that the first list is consistent with a user interest profile.

9. The non-transitory computer-readable medium of claim 8, wherein extracting data related to the item from the electronic document comprises the operations:

navigating to an electronic source;

fetching one or more items that are associated with the electronic source; and fetching one or more lists that are associated with the electronic source.

10. The non-transitory computer-readable medium of claim 9, wherein the first list is saved to the electronic data storage device with an updated priority score.

11. The non-transitory computer-readable medium of claim 10, the operations further comprising calculating the updated priority score by:

getting a list type score;

calculating a consistency score;

calculating a richness score;

calculating a freshness score; and calculating the updated priority score based on at least one of the consistency score, richness score, or the freshness score.

12. The non-transitory computer-readable medium of claim 9, wherein the item is selected from the electronic document by a user.

13. A system comprising:

a memory; and a processing device operatively coupled to the memory, the processing device being configured to:

select a first item from an electronic document;

extract data related to the first item from the electronic document;

identify a first list that includes the first item;

refine the first list in response to an identification of the first list, wherein the refining the first list comprises:

extract a string list of text items from the first list by scraping the first list;

construct a suffix tree based on the extracted string list of items;

detect repeated patterns in the suffix tree;

identify a pattern that is present in each item in the string list of items;

select a feature pattern based on a length metric and a frequency metric; and group two or more items in the string list of items based on the feature pattern;

generate a second list that includes the first item in response to a failure to identify the first list;

attempting to verify that the first list is consistent with a user interest profile, wherein the verifying that the first list is consistent with a user interest profile comprises:

aggregating metadata of the first list with the metadata from a second the list;

assigning a first weight to the first list and a second weight to the second third list;

generating a first vector representation of the first list and a second vector representation of the second list;

calculating a first content-based match with the user interest profile by calculating a first distance between the first vector representation of the first list and one or more user interest vectors, and calculating a second distance between the second vector representation of the second list and the one or more user interest vectors; and filtering at least one item of either of the first list or the second third list based on the first content-based match;

failing to verify consistency of the first list with user interest profile;

select a second item in the first list to use for a verification of the first list with the user interest profile;

generating a third vector representation of the first list that excludes to the first item;

calculating a second content-based match with the user interest profile based on the third vector representation of the first list; and verifying, based on the second item and the second content-based match, that the first list is consistent with a user interest profile.

14. The system of claim 13, wherein the processing device is further configured to:

identify a third list in the electronic document; and extract metadata from the third list.

15. The system of claim 13, wherein the first list is saved to the electronic data storage device with an updated priority score.

16. The system of claim 15, wherein the processing device is further configured to:

calculate the updated priority score by:

get a list type score;

calculate a consistency score;

calculate a richness score;

calculate a freshness score; and calculate the updated priority score based on at least one of the consistency score, richness score, or the freshness score.

* * * * *